United States Patent [19]

Spinoglio

[11] Patent Number: 4,735,813

[45] Date of Patent: Apr. 5, 1988

[54] PROCESS FOR BLEACHING MUSHROOMS AND OTHER VEGETABLES

[76] Inventor: Mario Spinoglio, 66 Boulevard des Anglais, Peronne, France

[21] Appl. No.: 810,383

[22] PCT Filed: Oct. 4, 1984

[86] PCT No.: PCT/FR84/00220

§ 371 Date: Nov. 26, 1985

§ 102(e) Date: Nov. 26, 1985

[87] PCT Pub. No.: WO85/01420

PCT Pub. Date: Apr. 11, 1985

[30] Foreign Application Priority Data

Oct. 4, 1983 [FR] France ............................ 83 15805

[51] Int. Cl.⁴ .................... A23B 7/06; A23B 7/148
[52] U.S. Cl. .................... 426/281; 426/302; 426/615
[58] Field of Search .......... 426/262, 281, 302, 325, 426/615

[56] References Cited

U.S. PATENT DOCUMENTS

| | | | |
|---|---|---|---|
| 3,476,078 | 11/1969 | King | 118/30 |
| 3,843,810 | 10/1974 | Fehmerling | 426/615 |
| 4,143,167 | 3/1979 | Blanchaud et al. | 426/281 |
| 4,331,691 | 5/1982 | Pooviah et al. | 426/302 |
| 4,557,937 | 12/1985 | Bournier | 426/281 |

FOREIGN PATENT DOCUMENTS

| | | | |
|---|---|---|---|
| 0021629 | 1/1981 | European Pat. Off. | |
| 2197531 | 3/1974 | France | |
| 45-19619 | 6/1966 | Japan | 426/241 |

Primary Examiner—George Yeung
Attorney, Agent, or Firm—Brumbaugh, Graves, Donohue & Raymond

[57] ABSTRACT

A process for treating vegetables such as mushrooms employs an instantaneous vacuum to remove gas and partially dehydrate the vegetable. A gel coating may be used to achieve expansion of the vegetable tissue. Subsequently, an impregnation liquid is added. The impregnation liquid may be a coagutable material.

13 Claims, 5 Drawing Sheets

PROCESS FOR BLEACHING MUSHROOMS AND OTHER VEGETABLES

French Patent Application No. 81 17250 of Sept. 11, 1981 describes a process for bleaching mushrooms and other vegetables, improving the qualitative and quantitative characteristics of the product obtained, particularly with a view to subsequent preservation or deep-freezing thereof.

The food products which may be treated are, in particular, "Paris" mushrooms, forest mushrooms such as chanterelles, boletus or morels, cultivated mushrooms such as Pleurotes and Eudelis, as well as other vegetables such as asparagus, artichokes, salsifies, carrots, French and dried beans, peas, celery, chicory, various cabbages.

These products are cooled to 0°–2° C. and their reheating is avoided during the operations of cleaning the vegetables. Washing will advantageously be effected with icy water. In addition, this washing must be carried out so as to reduce to a maximum the absorption of the washing water, for example: by spraying under pressure after dry-cleaning on a vibrating table with ventilation, the purpose of which is to reduce the duration of washing.

After cleaning, washing, trimming and possibly calibration and distribution by quality, the products undergo a complementary cooling to the limit of the temperature of freezing. The product is then introduced into an enclosure in which a high vacuum, of the order of 1 to 5 millibars, is made, whilst maintaining the preceding temperature, i.e. at the limit of freezing.

In fact, it is quite preferable that the vegetable be previously cooled but not totally so, i.e. it is preferred according to the invention that the vegetable terminate its phase of cooling (some degrees Centigrade) up to the limit of freezing in the enclosure under high vacuum; in fact, according to the invention, it will be arranged that the last stage of vacuum, with which one will proceed, brings the vegetable to the threshold of freezing, by the known phenomenon of evaporation.

The product will then be impregnated with an impregnation liquid which is itself cooled to the adequate temperature (in order that no evaporation is produced at the pressure in question). Such impregnation is obtained by immersion in said liquid then by breaking the vacuum, the latter operation inducing the impregnation proper.

The present Application describes novel, improved possiblities for effecting degassing, impregnation and bleaching of the vegetables, and more particularly mushrooms.

The invention also relates to apparatus for carrying out the improved techniques of degassing and impregnation.

Finally, the invention relates to a process of bleaching coupled with a thorough degassing, or with an operation of degassing-impregnation.

According to one aspect of the invention, it has been discovered that the structure of the vegetable could be acted upon to increase its porosity and to promote the total evacuation of the included gases, this making it possible to effect a much deeper impregnation than in the prior art, without inclusion of undesirable residual gas.

The increase of the porosity of the vegetable, more especially of the mushroom, may be effected by two techniques, which may, moreover, be combined.

The first technique consists in effecting degassing in two stages; the first stage consists in instantaneously placing the object to be degassed in vacuo and the second stage consists in completing this vacuum with trapping of the water vapour which is then released from said objects. When one operates in this manner, the canals in the vegetable apparently undergo an expansion which facilitates complete degassing of said vegetable.

One advantage of this technique over what was described previously is that the temperature of the vegetable which is subjected to degassing is much lower. The vegetables subjected to degassing may be at ambient temperature or may have been cooled.

Instantaneously placing in vacuo is understood to mean placing under a partial vacuum in a very short space of time, less than 10 s and preferably of the order of 1 s. Such instantaneous placing in vacuo often requires that the recipient in which the vegetables have been deposited be placed rapidly in contact with a buffer recipient of relatively large volume (for example 10 to 20 times the volume of said recipient containing the vegetables) in which the vacuum was previously made.

In this first stage, the vacuum made will be of the order of magnitude of the vacuum which corresponds to the boiling of the water contained in the treated vegetables.

In the second stage, the vacuum will be completed and taken to about 1 to 6 mbar. As in this stage degassing of the vegetable implies a certain dehydration thereof and therefore the evacuation of an appreciable quantity of water vapour, it will be necessary, industrially, to trap said water vapour. This may be carried out by any known means and in particular by passage of the desorption gases over suitably cooled elements.

The limiting vacuum envisaged at the end of degassing is that which corresponds to the threshold of freezing of the water in the vegetable.

These two stages are in fact closely linked with each other to the point of merging if the capacity of the equipment (pumps and traps) is sufficient.

It will be noted that this evaporation of water which develops during the placing in vacuo of the vegetables will cool said vegetables to a considerable extent.

The second technique for increasing the porosity of the vegetable consists in effecting this degassing on a coated vegetable.

To carry out this technique, the vegetables are coated by immersing them in a liquid which may set in the form of reversible gel and, by opposing the release of the included gases, provoke expansion of the tissues. The consistency of the gel will be calculated for each case. This gel may be made by a solution of gelatin, pectin, natural gums or alginates. When the deep vacuum is established, this film tears, releases the included gases and does not oppose the impregnation; it is eliminated by washing in water and possibly brushing.

These two techniques may be combined. When the thorough degassing according to the invention has been effected, the vegetable, for example the mushroom, will be impregnated as known with a suitable liquid. It has been found, and this is very important for the subsequent operations, particularly bleaching, to be able to be carried out under the best conditions, that the liquid used had also to be degassed before impregnating the vegetable.

It is known (main Patent) that the food product is firstly immersed in vacuo in the cooled impregnation liquid which contains a coagulating product. Advantageously, this coagulating product is for example egg white. The concentration of coagulating product is from about 4 to 25% by weight of dry matter with respect to the impregnation liquid, preferably 6 to 12%.

Following this immersion, either a single impregnation, a partial impregnation, or multiple impregnations may be proceeded with.

Single impregnation is obtained by a single rise in pressure up to atmospheric pressure or a higher pressure (2-10 bar), which promotes and increases the rapidity of impregnation, particularly for vegetables such as carrots and salsifies.

Partial or multiple impregnations may also advantageously be proceeded with.

To this end, after having created a vacuum in the enclosure containing the food product (degassing of the vegetable), this high vacuum is maintained and immersion is effected in a first treatment liquid with a high concentration of coagulant, for example 10 to 25% by weight of dry matter. The coagulant may be egg white.

The pressure is then raised to an intermediate value, for example 500 mbar, which provokes a first impregnation by the liquid with a high concentration of coagulant. Under this intermediate pressure, the treatment liquid is evacuated towards a receiver enclosure under the same pressure. What therefore remains in the first enclosure is the partially impregnated food product which is not surrounded by treatment liquid and which is always under the intermediate pressure, for example 500 mbar.

A second impregnation is then admitted, of which the concentration of coagulant is from about 0 to 4% by weight of dry matter. This may therefore be either water or a solution having a very low concentration of coagulant agent; the latter may moreover come from the residue of the first impregnation liquid adhering to the vegetables.

The pressure is then raised to atmospheric pressure or to a higher pressure, which produces the second impregnation.

For the details of modus operandi and the different products used, the man skilled in the art may refer without difficulty to the main Patent.

DETAILED DESCRIPTION OF THE INVENTION

Figure 1:
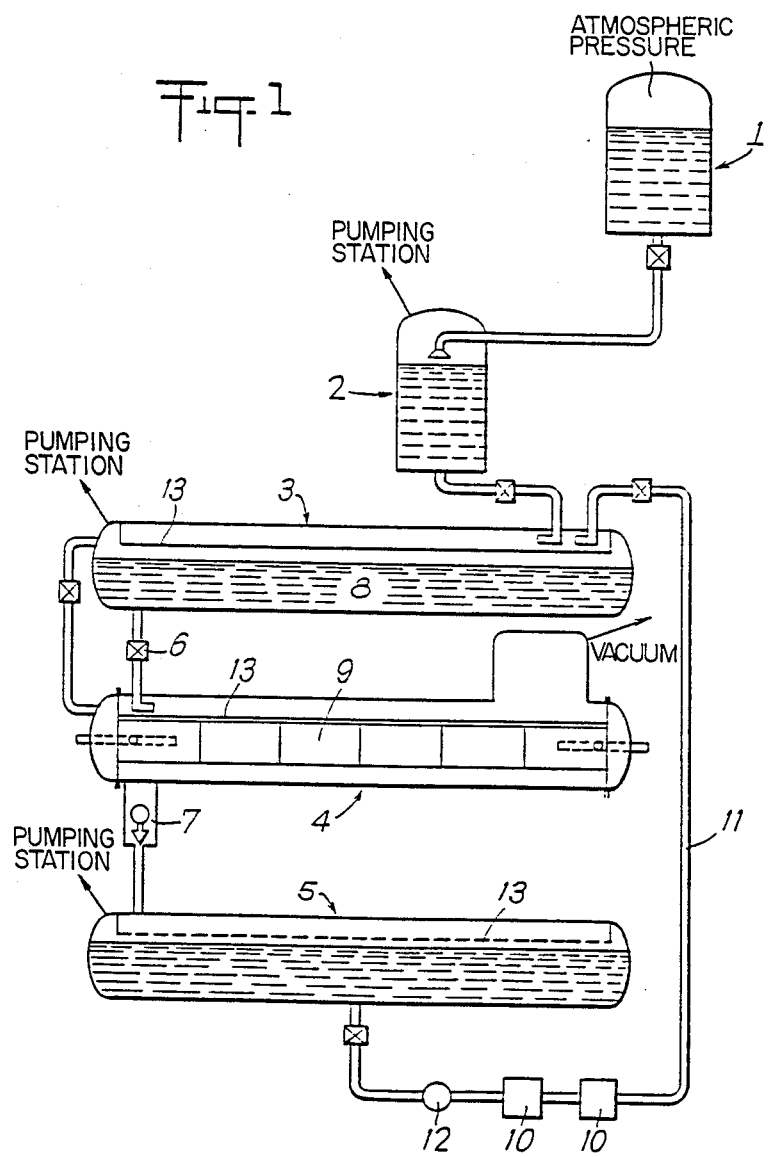
FIG. 1 shows an impregnation apparatus according to the invention operating discontinuosly.

According to one aspect of the present invention, it has been discovered that degassing during placing in vacuo could be prevented to a certain extent. The vacuum then provokes an expansion of the included gases and therefore an increase in the porosity. When the included gases are replaced by the impregnation liquid (or liquids), a much better impregnation is therefore obtained.

The technique of preparation of the vegetables, according to the invention, comprising in particular a placing under deep vacuum by successive instantaneous stages of vacuum, at the threshold and sometimes at the beginning of freezing, and the impregnation by one or more perfectly degassed liquids, brings an appreciable saving of weight and a conservation of the beneficial juices of the vegetable in the structure thereof, and reduces losses during subsequent heat treatments of the vegetable.

The yield thus gains 3 to 10 points (i.e. gains 3 to 10 supplementary % in absolute value) for roots: carrots, turnips, salsifies, and up to 30 points for the very porous vegetables such as mushrooms.

This is of considerable economic importance as the improvement bears on an increase in the yields by weight of a virtually finished product.

By way of example, it is known that the "Paris" mushroom usually loses 35% of its weight, after trimming dry, during the thermal treatments of cooking and bleaching for 15 mins. at 95°/100° C.

The process according to the invention makes it possible to obtain, at the end of the same treatments, a weight of mushrooms which remains identical to the weight of mushrooms introduced.

In the particular case of the mushroom where the conventional technique of degassing in vacuo with water brings about an absorption of about 60% of water, totally rejected in the course of cooking, bringing about a leaching of the soluble fractions, detrimental as to the quality of the finished product, it has been ascertained that the technique of very thorough degassing according to the present invention (effected in particular by the placing under high vacuum obtained by successive stages of vacuum, all at the limit of freezing, in combination, as will be stated hereinafter, with a constant degassing of the impregnation liquid), made it possible for the first time considerably to reduce this leaching; in addition, it has been observed that an addition of 2 to 5% of sodium chloride considerably reduced the percentage absorbed and allowed from a qualitative and nutritional standpoint the retention in the mushroom of the absorbed liquid especially when the latter represents a food.

When the impregnation liquid is water, it has been observed that an addition of sodium chloride may advantageously be effected at doses varying between 2 and 25% as a function of the rate of impregnation. The addition of sodium chloride will also be adjusted in order that the final product be correct from the standpoint of salinity. It has been ascertained that the presence of sodium chloride reduced the quantity of impregnated water, which is particularly advantageous for very porous products, such as mushrooms in particular. This reduction of the absorbed water improves the final quality of the product thanks to a reduction of the phenomenon of leaching and an increase in the yield of dry matters. These advantages are also verified when the impregnation liquid represents a food. In that case, a final weight of vegetables was able to be obtained, equal to the sum of the weights of the vegetable and of the impregnation liquid. On the contrary, in the state of the art, a final product is obtained whose weight lies below the initial weight of the vegetable.

According to the invention, a technique has thus been able to be defined, consisting in impregnating the mushroom with a coagulatable liquid, but in provoking in a first stage a superficial coagulation either by chemical or enzymatic means or by a high temperature applied for a short time (10 s for example).

After the formation of a relatively water-tight peripheral zone, the operations of baking are proceeded with, by progressively raising the temperature of the mushroom so that the exudates mix with the impregnation liquid before the latter coagulates either by heat or by a chemical or enzymatic effect; proceeding in this manner, all the internal liquids will form a gelified structure comparable to the normal texture of the flesh of the mushroom and allowing it to be cut into slices without flow of liquids greater than some (1 to 3) % by weight.

The impregnation liquids may be very different from one another depending on the vegetable treated and the aim sought after:

(1) When it is essentially desired to avoid the negative effects of the presence of gas in the vegetable, water alone will be used as impregnation liquid.

It has been ascertained that, in this case, it was advantageous to adapt the mineralization of the water as well as its pH to the vegetable treated: a softened or demineralized water is suitable for certain vegetables such as mushrooms, peas, haricot beans, lentils and broad beans, where tenderness is sought, whilst, on the contrary, a hard water will suit for the vegetables whose firmness is desired to be improved: French beans, lettuces, cabbages, salsifies.

When an antagonistic action of the calcium present in the vegetable is sought, an addition of polyphosphates of soda is effected, of which the pH suits the pH finally sought, and this addition gives interesting results, in particular with those vegetables rich in proteins. For the mushroom, those polyphosphates whose $P_2O_5$ content is greater than 60% are particularly suitable, used at the dose of 2 to 30 g/l. In those cases, purified salt must be chosen in order to avoid an addition of calcium.

Concerning the pH, its value will be adjusted to the lowest value compatible with the imperatives of consumption, which proves to be interesting, as such a pH promotes conservation and facilitates sterilization.

Whether a thorough degassing is essentially desired, or whether seasoning or enriching substances are incorporated in addition, by the impregnation or impregnations, it sometimes proves advantageous to be able to reduce this impregnation for those vegetables which present considerable porosity: it has been discovered that an addition of sodium chloride in proportions of 1 to 25% (in order to obtain a correct salinity of the final product) made it possible to reduce the absorption in considerable proportions: from 20 to 80%. Thus, for the mushroom, an addition of 2 to 5% of sodium chloride in the water reduces by 30 to 60% the quantity of water or impregnation liquid absorbed. This technique is of considerable interest for balancing the ratio between the vegetable and the impregnation liquid and for reducing or even eliminating rejection in the course of bleaching of the water or the impregnation liquid, such rejection provoking a detrimental "leaching".

In the particular case of the mushroom where the conventional technique of degassing in vacuo with water brings about an absorption of more than 60% of water which is totally rejected in the course of cooking, which brings about a leaching of the soluble fractions which is detrimental as to the quality of the finished product, the reduction according to the invention of the absorption and of the rejection during cooking renders possible the use of thickening agents which will be chosen as a function of the vegetable and the final appearance: starches, modified starches, extracts of algae, gums, gelatins and derivatives of milk, pectins, alginates, derivatives of cellulose.

Balancing of the salinity and of the pH at this level of manufacture facilitates the following operations from the double standpoint of quality and of yield: in fact, the detrimental effects of osmosis between the salty cover juice and a non-salty vegetable are avoided; the vegetable loses part of its constitution water in favour of the juice; the lowered pH may allow a reduced sterilization range.

(2) When, with degassing, a seasoning is sought, and in addition to the problem of salinity and of acidity treated previously, there is obviously posed the problem of the adjustment and reduction of the rate of absorption. The same applies when the impregnation liquid is enriched with substances such as proteins, starches, sugars, oils.

The two cases will be treated together, as they will often be merged in practice.

Two cases are to be considered:

(a) the vegetable remains whole or is cut into large pieces in its final phase;

(b) the vegetable is cut into small pieces or slices in its final phase.

Sometimes, certain vegetables are presented in both aspects, which is the case for example of the mushroom: whole, sliced, in pieces.

(a) In the case of the vegetable remaining whole, it is sometimes possible to accept that the impregnation liquid remain fluid inside the vegetable, its viscosity possibly being adjusted as is done for pure water. However, a water-tight peripheral zone must be produced to facilitate the operations of bleaching and conditioning without losses of yield.

In these cases, one will proceed according to the invention with a "double impregnation". Such double impregnation will be described in the following.

(b) in the case of the vegetable being fractionated, it will prove necessary to gelify the whole of the liquids absorbed. A variant of the technique of double impregnation may be used, or a single impregnation. The impregnation liquid will be composed so that it is capable of undergoing a coagulation either by heat, or by chemical or enzymatic coagulation.

A superficial coagulation may be provoked by heat or by chemical or enzymatic means, immediately after impregnation, or a deferred coagulation may be produced when the juices of the vegetable will have been mixed with the impregnation liquid, in particular after-cooking of the vegetable. Among the products allowing this operation, the alginates and derivatives of milk will preferably be retained.

According to another variant embodiment of the invention, it has been discovered that it was sometimes advantageous to integrate degassing and bleaching, in particular when it was not sought to impregnate the vegetable. In that case, when degassing is terminated, there is admitted into the enclosure water vapour of which the temperature will be included between +80° and +150° C. as a function of the vegetable treated. This vapour, exempt of incondensable substances, will condense on and in the vegetable, and, by controlling the pressure in the enclosure, the maximum possible temperature of the vegetable may be maintained at all points at the desired value; this temperature may be progressive up to the value which will be the most opportune, and, by increasing the pressure in the enclosure, high values necessary for sterilization of the product or peeling thereof may be attained.

The return in vacuo will then make it possible to lower the temperature rapidly and to the desired value, still by controlling the pressure in the enclosure. When it is question of a very porous vegetable such as the mushroom or lettuces, thorough bleaching is effected at +90° C. with a reduction in time of close to 80% with respect to a bleaching with water. By employing the process according to the invention, from 150 to 200 g of water vapour will be sufficient to treat 1 kg of vegetables. For the mushroom, bleaching is produced without impregnation of liquid from the end of degassing; when an impregnation is desired, the impregnated vegetable is returned in vacuo after evacuation of the impregnation liquid and the water vapour is injected when +90° C. has been attained, or the vegetable is immersed in water at +90° C. and taken to atmospheric pressure or to a higher pressure. The hot water is evacuated under pressure and cold water is admitted in order to cool the whole whilst maintaining under pressure. This modus operandi makes it possible to integrate in one apparatus all the operations of degassing, of impregnation, of bleaching and of cooling, all without handling the product. The reduction in time is appreciable and 2 to 4 points of yield are saved.

It is possible to condition, according to a particular case, the mushrooms at the end of preparation in oil, in accordance with the following method:

After degassing, hot oil at +80°/+100° C. is admitted very rapidly in the impregnator, and the vacuum is interrupted in order to avoid evaporation of the water of constitution of the mushroom. In this oil was previously dispersed the very finely ground and dehydrated seasoning. Cooking will be continued by heating of the oil.

The product thus obtained has a better presentation and the succession of the conventional operations which expose the mushroom and the oil to air with the well known drawbacks of such manipulations, is avoided.

In order to respond to the evolution of food habits and to reduce the rate of lipids in these preparations, this operation may be carried out with an oil-in-water emulsion seasoned and with a gelling agent added thereto, and the whole or cut vegetables may be treated according to the techniques described.

The invention will be more readily understood on reading the following non-limiting examples.

(1) One sole impregnation liquid (a) Coagulatable by heat

The impregnation liquid might consist in a mixture of proteins and of native or modified starches (preferably rice starch) in the state dispersed or dissolved in 2% salt water.

After impregnation, a brief thermal treatment is effected of 10 to 20 s in water under pressure or water vapour at 100°–120° C. or in a bath of vegetable oil or of edible fat (these two latter fluids will be preferred whenever they can be used as there is no dilution of the impregnation liquid and furthermore these fluids allow a higher temperature to be chosen) followed by a rapid cooling by aspersion of water which provokes the swelling of the starch and gelling thereof in the superficial part and the formation of a seal. Cooking will be effected by taking a temperature from +60° C. to +100° C. to attain +90° C. at the heart progressively in 10 to 15 mins depending on the size of the mushrooms. A cooling below +20° C. effected rapidly will promote the formation of a firm gel.

(b) Chemical coagulation

The impregnation liquid may comprise proteins and/or native or modified starches, pre-cooked and salted to 2%.

Deferred gelling will be ensured by the use of sodium alginate at the dose of 1 to 2%, the sourse of calcium necessary for gelling will be calcium sulfate or dicalcium phosphate 0.2 to 0.4%, the gelling retarder sodium metaphosphate at the dose of 0.4%.

After impregnation, a superficial coagulation is obtained by immersion in a solution of calcium chloride dosed from 5 to 20% depending on the desired immersion time.

After superficial coagulation, cooking will be effected in water at a progressive temperature of +60° C. to +95° C. to attain +90° C. at the heart, the cooking water will have 0.5 to 1% citric acid added thereto.

After cooking and cooling, the suitably salted conservation juice will be acidified by addition of citric, acetic, lactic, ascorbic acid and mixtures thereof, at a rate of 0.5 to 1%, in order to obtain the desired pH as a function of the mode of conservation retained.

We have obtained particularly interesting results by using as acidifying agent purified hydrochloric acid: with very low doses, the desired pH are obtained without the appearance of the "acid" flavours as with the organic acids whose dosage is ten times higher. We believe that the use of hydrochloric acid presents noteworthy technological advantages for the products of which it would be desirable to reduce the pH to below 4.5 without the acid taste appearing unfavourably. Apart from mushrooms, other vegetables would gain much from this (salsifies, chicory, celery, artichokes, inter alia). It is known that there is a problem of authorization of use from the competent services of each country.

(2) Two impregnation liquids

In this technique, deep impregnation may be effected with an impregnation liquid having a purpose of seasoning and/or enrichment in nutritional elements (spices, sapidity agents, oils, vinegar, broths from cooking mushrooms, vegetables, etc.), possibly reinforced by thickening agents and/or gelling agents. From the latter, mention may be made of xanthan gum, carraghenates, gelatin, derivatives of milk, starches. In particular, xanthan gum will be used. (Generally, in the case of using pure water as impregnation liquid, a favourable effect has been noted when the viscosity of the water is increased. To this end, gelatins, derivatives of milk, native or modified starches, extracts of algae including alginates, natural gums and in particular xanthan gum are used. This avoids the subsequent loss of impregnation water.)

Superficial impregnation will have for essential function the retaining in the product of the natural juices and of the liquid of first impregnation. This superficial impregnation may be effected by an alginate which will be gelled as indicated hereinabove (calcium chloride).

This second superficial impregnation will be effected in accordance with the modi operandi described for the treatment with one liquid.

A variant of this method of double impregnation consists in endowing the first liquid with alginate, the source of calcium and the retarder, the second impregnation liquid further comprising citric acid and ascorbic acid. Gelling will be produced after a few minutes without any other operation. This variant may advantageously be used for mushrooms intended to be frozen raw, whole or cut. The presence of starch and of sugars will improve the stability of the jelly at freezing and defrosting.

Interest of the process, the conservation of the mushroom is clearly improved, the usual darkening of the frozen raw mushroom avoided.

The invention therefore consists in effecting a superficial gelling on the surface of the vegetable, so as to prevent the loss of the impregnation liquid during cooking.

In the case of multiple impregnation operations, it has been recalled hereinabove that the pressure must be raised in stages.

It has been noticed that, starting from the high vacuum, the slightest rise in pressure provoked in fact the quasi-total (90%) invasion of all the canals of the vegetables, whilst it would have been desired for example to make a double 50%/50% impregnation.

It has been discovered according to the invention that, in order to control well the limit of the first impregnation, the pressure had previously to be raised with the aid of a gas not opposing impregnation itself.

According to the invention, after a thorough degassing of the product at the limit of freezing, the injection is proposed either of a gas diffusing very easily: helium, or of a gas having a good solubility in water: carbon dioxide gas, i.e. a gas which is easy to eliminate.

The prior rise to a pressure of 100 mbar will allow an impregnation of about 50% passing from 100 to 200 mbar. Then, on passing from 200 mbar to 1000 mbar, the other 50% of the possibilities of absorption are made.

It appears with this method that it is possible to control absorption; in fact, if, after a rise to 400 mbar, the impregnation liquid is evacuated before the rise to 1000 mbar, the impregnation will be limited to about 75% of the possibilities. The balancing gas may be evacuated by diffusion if its diffusion is easy. In the case of carbon dioxide gas, cooking under pressure will avoid the effects due to the expansion provoked by the heat, which expansion would have as consequence the expulsion of part of the internal juices.

The invention therefore consists, under this aspect, in replacing a rise in pressure in stages from the high vacuum by a rise in accordance with the same principle, but effected from a pressure previously raised to 100 mbar for example. The multiple impregnations may then be much better controlled as the rise in pressure is much better controlled.

An indispensable aspect of this improvement resides in the choice of the gas for the prior rise to 100 mbar for example. It is imperative to choose a gas which is easy to eliminate in order that it does not oppose impregnation.

Hereinafter will be found the description of two original apparatus for carrying out the process described hereinabove.

Accompanying FIG. 1 shows an impregnation apparatus according to the invention, operating discontinuously.

Figure 2:
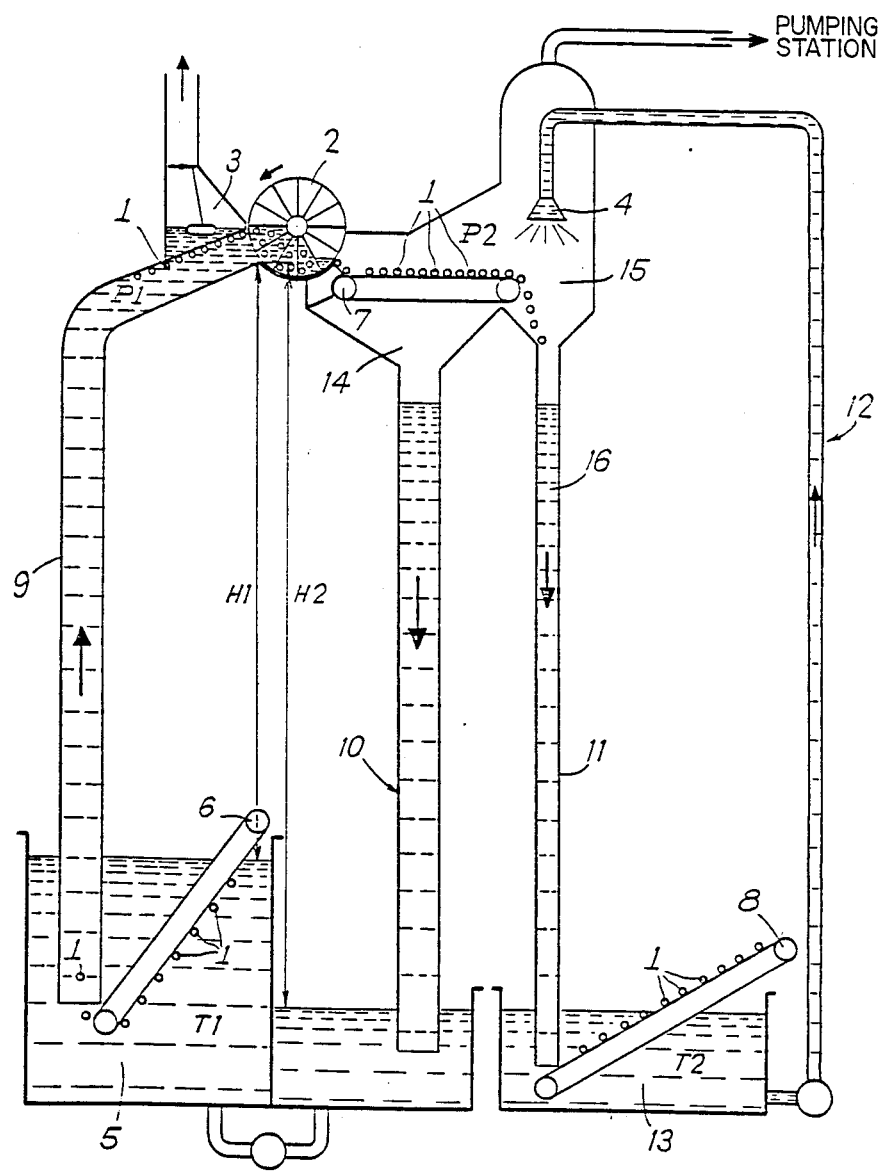
FIG. 2 shows an impregnation apparatus according to the invention operating continuously.

Accompanying FIG. 2 shows an impregnation apparatus according to the invention, operating continuously.

Figure 3:
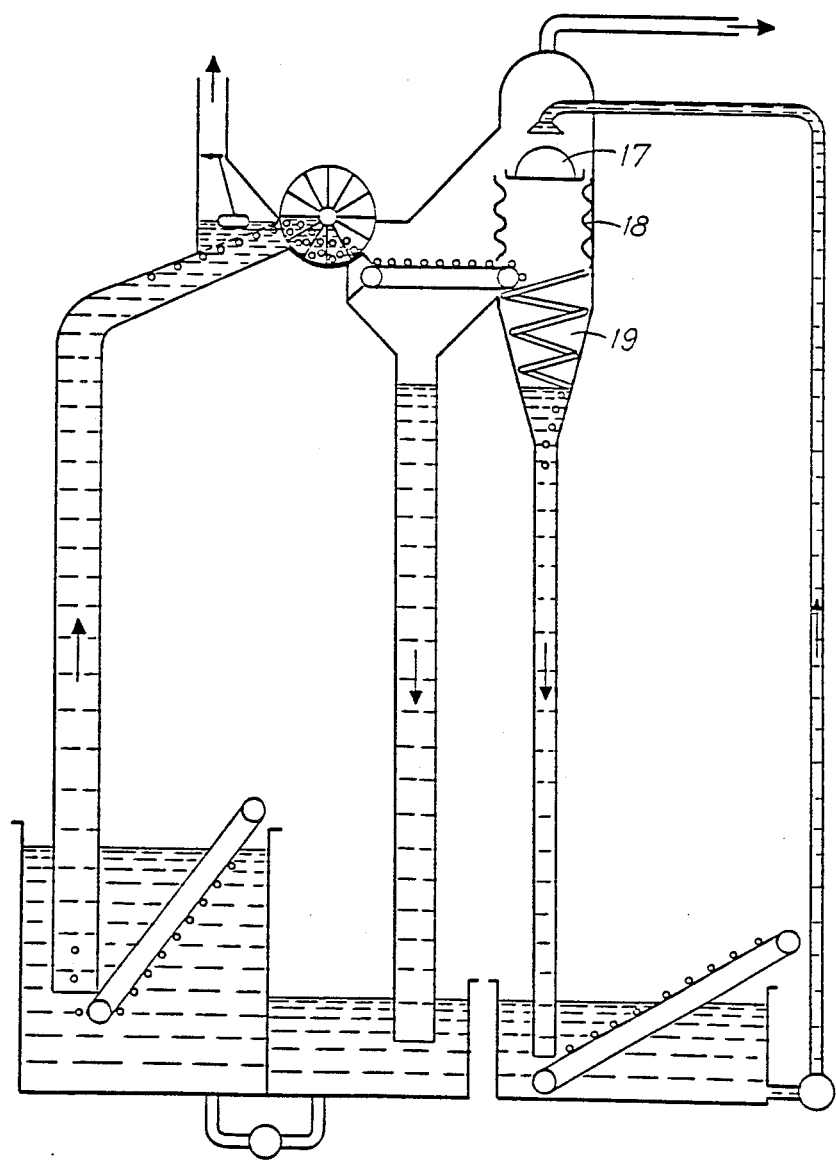
FIG. 3 shows an impregnation apparatus according to the invention.
Figure 4:
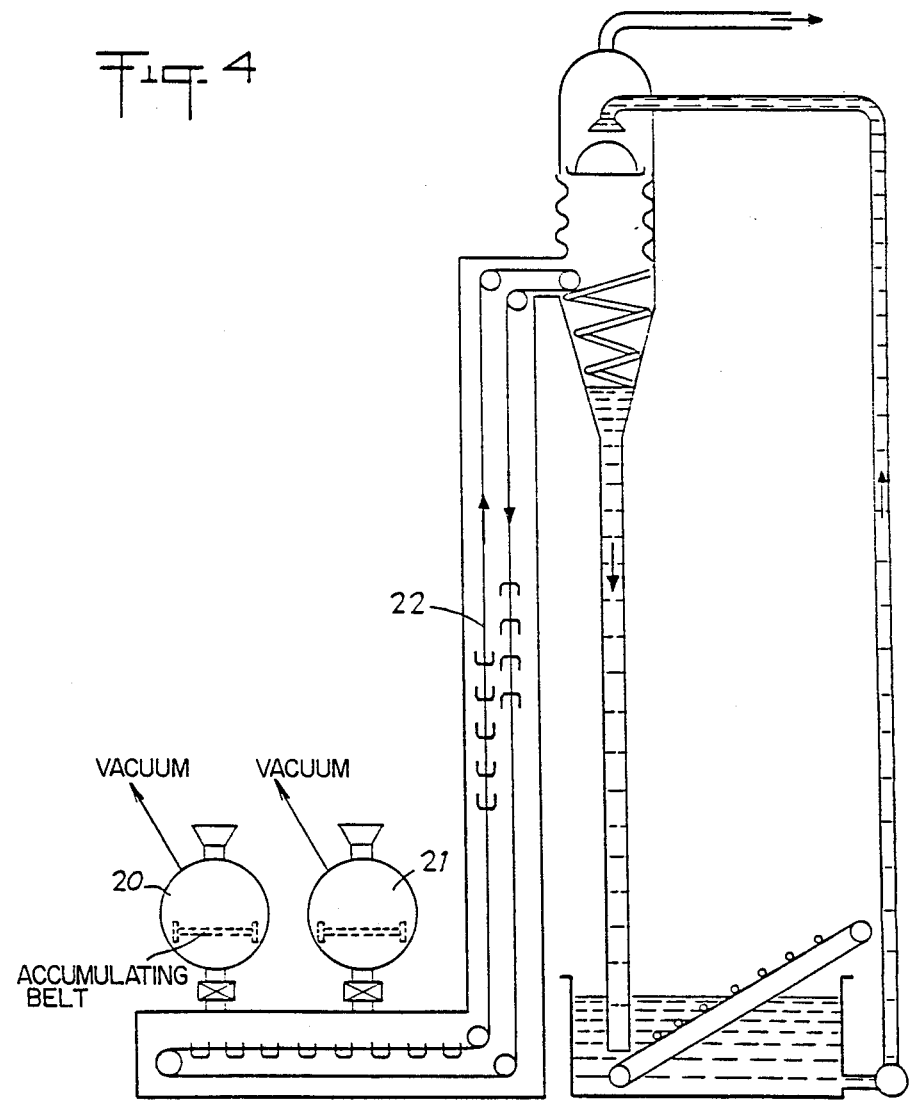
FIG. 4 shows an impregnation apparatus according to the invention.
Figure 5:
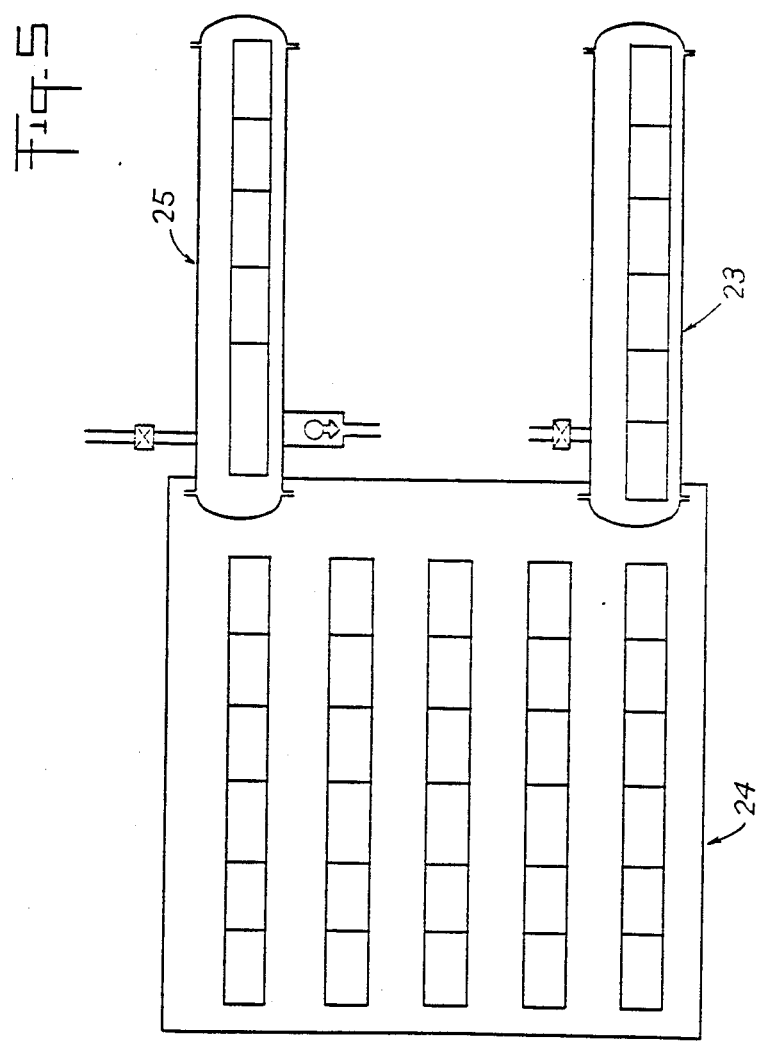
FIG. 5 shows an impregnation apparatus according to the invention.

Accompanying FIGS. 3, 4 and 5 show variants according to the invention of the apparatus shown in FIGS. 1 and 2.

The references have the following meanings:

FIG. 1

1. Tank for storage of the impregnation liquid (atm. p)
2. Tank for storage of the impregnation liquid in vacuo.
3. Refrigerated upper tank for storage of the impregnation liquid
4. Impregnator (refrigerated)
5. Refrigerated lower tank for storage of the impregnation liquid
6. Valve
7. Ball cock
8. Impregnation liquid
9. Baskets containing the vegetables
10. Filters
11. Conduit for recycling of the impregnation liquid
12. Recycling pump
13. Distribution sheet for the flow of liquid in a thin layer, promoting de-aeration.

FIG. 2

1. Vegetables
2. Rotary valve with supple blades
3. Ball cock
4. Diffuser for de-aerating the liquid
5. Water for conveying
6. Conveyor of vegetables (inlet)
7. Conveyor of vegetables (placing in vacuo)
8. Conveyor of vegetables (outlet)
9. Column for conveying
10. Column for recycling conveying water
11. Column for impregnation of the vegetables
12. Column for recycling the impregnation liquid
13. Impregnation liquid
14. Zone under high vacuum for degassing the water and the vegetables
15. Zone under high vacuum for degassing the impregnation liquid and the vegetables
16. Zone of impregnation
17. Distribution bell
18. Element for the flow of the impregnation liquid in a thin film
19. Helicoidal spout
20, 21. Enclosure for loading the vegetables, with placing under high vacuum
22. Mechanical elevator
23. Element for introduction of the vegetables
24. Cell for placing in vacuo
25. Impregnator A. The discontinuous operation of the apparatus is as follows:

(1) Placing under deep vacuum of the impregnator loaded with vegetables. Operation is effected with one or more intermediate stages of vacuum.

(2) Admission by gravity of the impregnation liquid. The latter was refrigerated in 3 and de-aerated by the action of the vacuum. Such de-aeration in vacuo was promoted by the sheet 13.

(3) The valve 6 is closed and the vacuum in the impregnator 4 is interrupted.

(4) After impregnation, the liquid is emptied by gravity and suction towards tank 5 likewise refrigerated, and which is under vacuum.

(5) Recycling of the liquid whilst a new batch of vegetables is loaded.

(6) Possibly, additional de-aerated impregnation liquid coming from tank 2 is supplied into the circuit.

Of course, a vertical configuration of the clements of the apparatus operating discontinuously would be equivalent B. Continuous operation of the apparatus is as follows:

The vegetables 1 are introduced beneath belt 6. The conveying water is at a temperature T1 at the limit of freezing.

The mushrooms are taken into column 9 by the current created by the rotary valve 2.

By way of indication, H1=9 m and H2=10.5 m, or a residual pressure P1 of the order of 100 mbar.

The rotary valve which constitutes one of the original features of the apparatus ensures transfer of the vegetables on conveyor 7 and ensures a very rapid transition between P1 and pressure P2 which corresponds to the high vacuum (P2≦6 mbar). Whilst the conveying water is recycled, the vegetables are totally degassed on the conveyor 7 before dropping into the impregnation liquid 13, pulverized and de-aerated previously in zone 15, and at its temperature T2 at the limit of freezing. The impregnated vegetables are removed from the liquid by conveyor 8.

According to a variant shown in accompanying FIG. 3, the impregnation liquid is pulverized on a distribution bell 17, from which it flows in a thin film on element 18, then from there on a helicoidal spout 19, the whole promoting degassing further.

According to another variant of the invention shown in accompanying FIG. 4, two enclosures 20 and 21 are used, operating alternately, for loading the vegetables on a mechanical elevator 22. The interest of this solution is that, from the loading enclosures 20 or 21, the vegetable is under high vacuum.

According to a variant of discontinuously operating apparatus shown in accompanying FIG. 5, there is disposed between element 23 serving as chamber for introduction and impregnation 24, a cell in vacuo 25 where the vegetable is exposed to the vacuum for a relatively long time. This improves regularity of operation, efficacy and considerably reduces the losses of time at the level of the impregnator.

I claim:

1. In a process for the degassing of vegetables and subsequent impregnation of the degassed vegetables with a liquid, the improvement comprising degassing the vegetables by placing said vegetables under a vacuum formed in a period of less than 10 seconds, wherein the final pressure achieved is between 1 and 6 mbar and corresponds to the threshold of freezing of water in said vegetables.

2. The improvement of claim 1, further comprising the step of trapping water vapor released from the vegetables by means of a cold surface.

3. The improvement of claim 1, wherein the vacuum formation takes place in two steps, a first step during which the vacuum achieved is paproximately that required to boil water contained in the vegetables; and a second step during which the final pressure is achieved and water vapor is removed.

4. The improvement of claim 1, wherein the vegetables are coated with a gel prior to degassing which opposes the release of gases from the vegtables until a selected vacuum is achieved, whereby the vegetables are expanded prior to release of the gases.

5. The improvement of claim 4, wherein the gel is formed from a solution of gelatin, pectin, natural gums, or alginates.

6. The improvement of claim 1, further comprising the steps of impregnating the degassed vegetables with an impregnation liquid which has itself been degassed.

7. The improvement of claim 6, wherein the vegetables are impregnated with a coagulatable impregnation liquid.

8. The improvement of claim 7, wherein the impregnation liquid comprises proteins and starches in 2% aqueous NaCl.

9. The improvement of claim 6, wherein at least two successive impregnation steps are carried out.

10. The improvement of claim 9, wherein contact of a first impregnation liquid with a subsequently applied second impregnation liquid results in coagulation.

11. The improvement of claim 9, wherein after degassing but prior to the first impregnation step the pressure is raised to about 100 mbar by addition of a gas which is easily eliminatable from the vegetable and wherein the impregnations are effected by further pressure increases up to about 1 bar.

12. The improvement according to claim 11, wherein the gas is helium of $CO_2$.

13. The improvement of claim 6 or 9, wherein the vegetables are superficially impregnated with a coagulatable impregation liquid which is coagulated to form a peripheral water-tight zone while the interior liquids remain uncoagulated.

* * * * *

UNITED STATES PATENT AND TRADEMARK OFFICE
CERTIFICATE OF CORRECTION

PATENT NO.   :   4,735,813
DATED        :   April 5, 1988
INVENTOR(S)  :   Mario Spinoglio It is certified that error appears in the above-identified patent and that said Letters Patent is hereby corrected as shown below:

Column 12, line 14, "paproximately" should read --approximately--;

Column 12, line 47, "of" should read --or--.

Signed and Sealed this

Twentieth Day of September, 1988

Attest:

DONALD J. QUIGG

Attesting Officer

Commissioner of Patents and Trademarks